United States Patent [19]

Itoh et al.

[11] Patent Number: 5,684,703
[45] Date of Patent: Nov. 4, 1997

[54] VEHICLE NAVIGATION APPARATUS WITH VARIABLE SPEED DISC DRIVE

[75] Inventors: Yasunobu Itoh; Mitsuhiro Nimura, both of Okazaki, Japan

[73] Assignee: Aisin Aw Co., Ltd., Japan

[21] Appl. No.: 482,622

[22] Filed: Jun. 7, 1995

[30] Foreign Application Priority Data

Sep. 1, 1994 [JP] Japan ................. 6-234105

[51] Int. Cl.$^6$ ................................. G06F 17/40
[52] U.S. Cl. ................. 364/443; 364/449.1; 364/449.3; 364/449.5; 340/990; 340/995
[58] Field of Search ................. 364/424.02, 424.05, 364/443, 449, 444; 340/995, 988, 901, 990; 342/357

[56] References Cited

U.S. PATENT DOCUMENTS

| | | | |
|---|---|---|---|
| 4,903,211 | 2/1990 | Ando | 364/443 |
| 5,177,685 | 1/1993 | Davis et al. | 364/443 |
| 5,184,123 | 2/1993 | Bremer et al. | 340/995 |
| 5,291,412 | 3/1994 | Tamai et al. | 364/449 |
| 5,323,152 | 6/1994 | Morita | 340/988 |
| 5,410,485 | 4/1995 | Ichikawa | 364/444 |
| 5,463,553 | 10/1995 | Araki et al. | 364/444 |
| 5,485,161 | 1/1996 | Vaughn | 342/357 |
| 5,493,294 | 2/1996 | Morita | 340/988 |
| 5,506,774 | 4/1996 | Nobe et al. | 364/424.05 |
| 5,508,930 | 4/1996 | Smith, Jr. | 364/444 |
| 5,535,125 | 7/1996 | Okabe | 364/449 |
| 5,539,397 | 7/1996 | Asanuma et al. | 340/901 |
| 5,544,087 | 8/1996 | Nakajima et al. | 364/443 |
| 5,559,511 | 9/1996 | Ito et al. | 340/995 |
| 5,568,390 | 10/1996 | Hirota et al. | 364/449 |

*Primary Examiner*—Kevin J. Teska
*Assistant Examiner*—Russell W. Frejd
*Attorney, Agent, or Firm*—Lorusso & Loud

[57] ABSTRACT

An information processing apparatus, for reading information from a memory medium such as a CD-ROM and displaying read information, includes a controller for controlling a drive motor which drives the memory medium. The drive motor is normally driven at a normal speed but is driven at a higher speed when a certain operation requires reading a large amount of information data within a certain time. After the data is read at high speed, the drive motor is automatically switched to normal speed. The drive motor drives at the higher speed only when necessary, so that the drive motor retains its durability and the information processing apparatus is more responsive.

24 Claims, 5 Drawing Sheets

24 ··· CONTROL UNIT
52 ··· CD – ROM DISC
54 ··· CD – ROM DRIVE
56 ··· DRIVE MOTOR
58 ··· PICKUP
60 ··· FEED MECHANISM
62 ··· PICKUP SERVO CIRCUIT
64 ··· DRIVE MOTOR SERVO CIRCUIT
66 ··· SIGANL PROCESSING UNIT
68 ··· CONTROLLER

- 24 ··· CONTROL UNIT
- 52 ··· CD-ROM DISC
- 54 ··· CD-ROM DRIVE
- 56 ··· DRIVE MOTOR
- 58 ··· PICKUP
- 60 ··· FEED MECHANISM
- 62 ··· PICKUP SERVO CIRCUIT
- 64 ··· DRIVE MOTOR SERVO CIRCUIT
- 66 ··· SIGANL PROCESSING UNIT
- 68 ··· CONTROLLER

VEHICLE NAVIGATION APPARATUS WITH VARIABLE SPEED DISC DRIVE

BACKGROUND OF THE INVENTION

1. Field of the Invention

This invention relates to a navigation apparatus for driving a memory medium in which information is stored, based on certain inputs or certain conditions of the apparatus, reading the information out of the memory medium, executing, based on the read information, processes relating to generation of guide information and outputting the guide information.

2. Description of Related Art

In the conventional navigation systems for vehicles which are currently commercially available, a CD-ROM disc, in which map information, image information for guidance and the like are stored in advance, is generally used as a memory medium. The CD-ROM is rotatably driven by a drive motor and certain information from predetermined addresses on the CD-ROM is read to a controller. The controller thereby executes various processes relating to generation of guidance, such as road guides for navigating the vehicle, parking place guides, and guides for rest areas, inns and hotels.

Such a conventional navigation apparatus frequently handles a large volume of information for providing detailed guidance. For example, a large volume of data is required to generate displays of maps and pictures as guidance information. Because the volume of the data information is large, it takes a long period of time to read the information from the CD-ROM disc for transfer to the controller. If processing of such a large volume of information, read from the CD-ROM disc, is required, the time between input of a command by an operator and display of the guidance information on the display unit, in response to the command, becomes inconveniently long.

In such a navigation apparatus, in general, a map showing the present position of the driving vehicle as well as its vicinity is displayed at the display unit, and guidance information is frequently displayed at intersections or whatever, so that as the vehicle moves, new map information and new guide information must be continuously read and displayed. Accordingly, low speed in reading such map information and guide information translates to lack of quick response by the apparatus. As the vehicle drives at higher speeds, the problem becomes more acute in that changing or scrolling of maps to be displayed becomes less timely.

SUMMARY OF THE INVENTION

It is an object of the invention to provide an information processing apparatus having a reduced response time for processing a large volume of information data without loss of drive motor life span.

The present invention achieves the foregoing object by providing an improved information processing apparatus for driving, responsive to an input or an operation of the apparatus, a memory medium in which information is stored, for reading said stored information from said memory medium, and for processing the read information to output guidance information. The improved apparatus of the present invention includes: a drive mechanism capable of driving the memory medium with a variable drive speed; judgment means for judging, based on an input or operative state of the apparatus, whether a certain condition has been satisfied; and control means for controlling the drive speed of the memory medium by said drive mechanism at a normal speed when the judgment means judges that the certain condition is not satisfied and at a speed higher than the normal speed when the judgment means judges that the certain condition is satisfied.

In operation of the apparatus of the invention, a judgment is first made as to receipt of a certain input or satisfaction of a certain condition and the drive speed of the memory medium is regulated by the control means so that the memory medium is driven at a normal speed when said judgment is negative, and in contrast, the memory medium is driven at a speed higher than the normal speed when said judgment is affirmative.

BRIEF DESCRIPTION OF THE DRAWINGS

The above and other objects and features of the invention will become apparent to those skilled in the art from a reading of the following preferred embodiments, when considered in conjunction with the accompanied drawings, in which.

DESCRIPTION OF THE PREFERRED EMBODIMENTS

Figure 1:
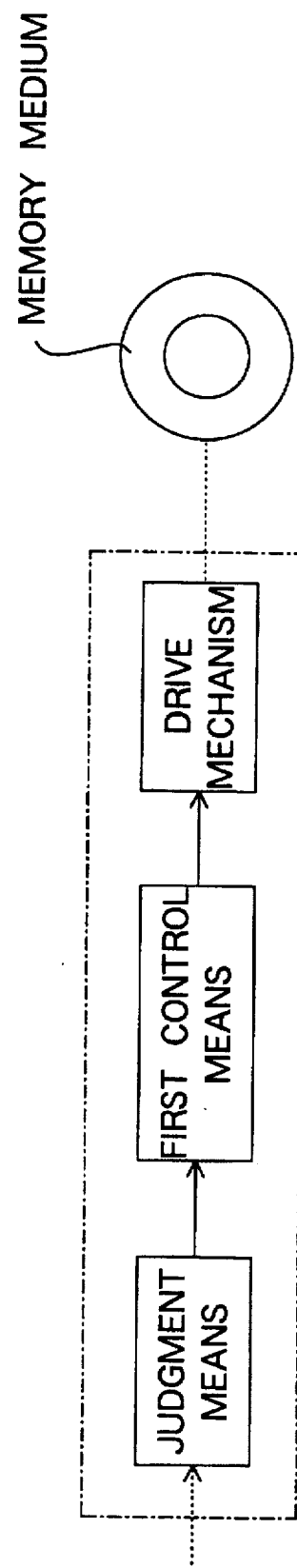
FIG. 1 is a block diagram illustrating the essential components of the invention.
Figure 2:
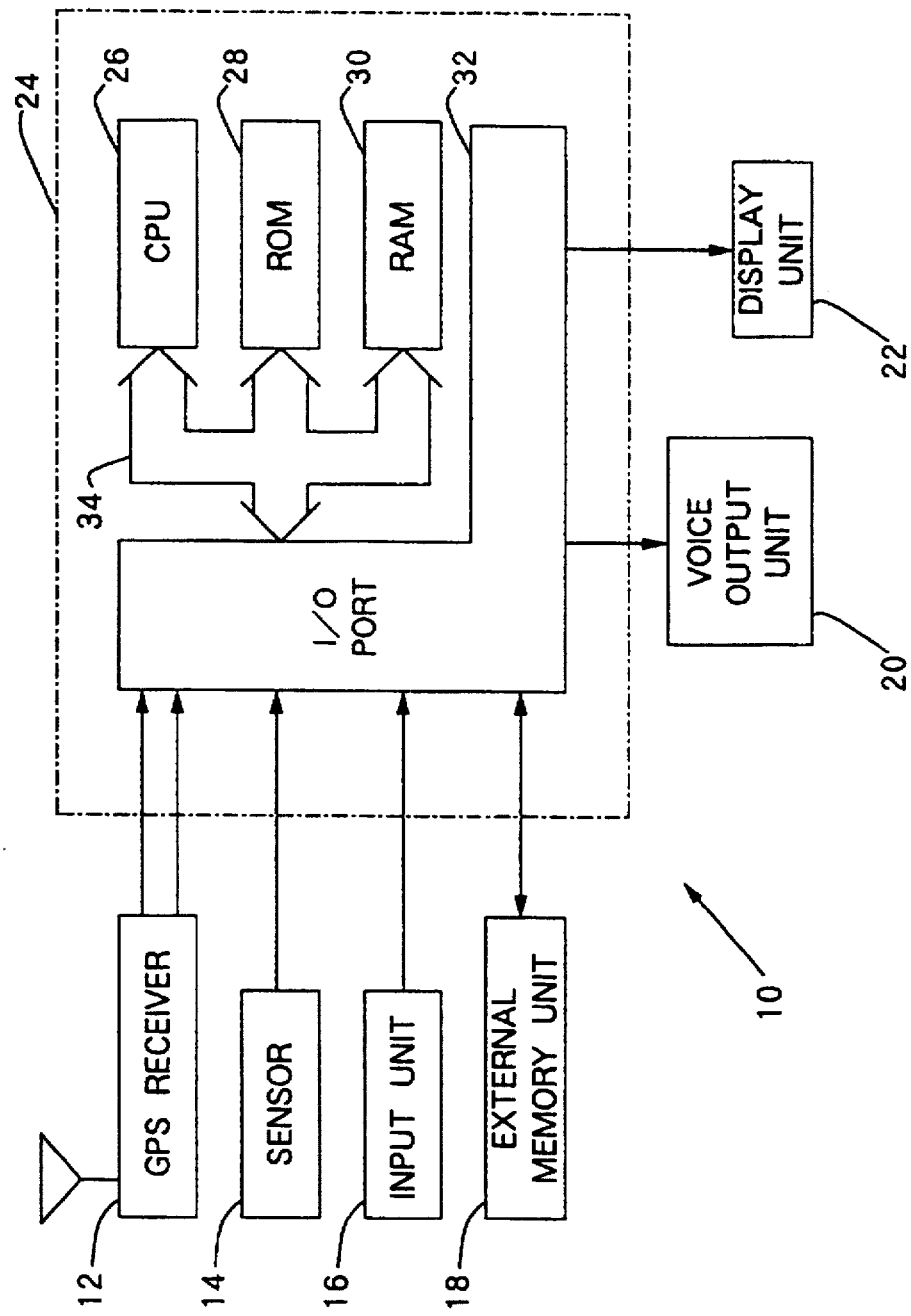
FIG. 2 is a block diagram of an entire navigation apparatus incorporating a preferred embodiment of the invention.

Referring to the drawings, in particular to FIG. 2, a navigation apparatus 10 according to a preferred embodiment of the invention is shown. The navigation apparatus 10 is designed for post-factory installation on or in a vehicle body. In other words, the navigation apparatus 10 is designed for installation by the vehicle owner. The navigation apparatus 10 is of the type that determines an optimum route to the destination chosen by the user and guides the vehicle from the current position to the destination by display of guidance together with maps on the display unit, as well as by outputting voice guidance through unit 20.

As shown in FIG. 2, the navigation apparatus 10 includes a conventional GPS receiver 12 for receiving transmissions from an artificial satellite (NAVSTAR) for the GPS (Global Positioning system), demodulating the received signal by frequency conversion, and calculating latitude data, longitude data and altitude data representing the receiving position, or the current position, as well as calculating travel speed and direction of travel of the vehicle. A sensor 14 detects the current position of the vehicle by outputting values corresponding to, respectively, traveling direction, traveling distance, and traveling velocity of the vehicle. An input unit 16 includes button type switches or contact switches for the operator to input various commands such as setting the departure and destination, changing display screens and the like. The external memory unit 18 includes, for example, a CD-ROM disc having optically readable data as a memory medium containing prestored data, and a CD-ROM drive for reading out the data stored in the disc. Voice output unit 20 has a speaker or speakers for voice guidance, various message sounds, and the like, a voice processor for synthesizing sounds made audible at the speaker, a digital to analog converter, and the like. The display unit 22 consists of a display screen such a cathode ray tube (CRT) or a liquid crystal display (LCD), a display controller for generating the images displayed on the display screen, such as road maps and various messages. Controller 24 reads the data from the GPS receiver 12, the sensor 14, the input unit 16, the external memory unit 18, and other inputs and controls the voice output unit 20 and the display unit 22 in accordance with the read data. The sensor 14 includes a distance sensor for detecting the distance travelled by the vehicle, a velocity sensor for detecting the speed of the vehicle, and a relative direction sensor, for example, such as a gyroscope or left and right wheel sensors. The controller 24 includes a conventional microcomputer equipped with a CPU (central processing unit) 26, a ROM (read only memory) 28, a RAM (random access memory) 30, an input and output port 30, and a bus line connecting these elements.

Figure 3:
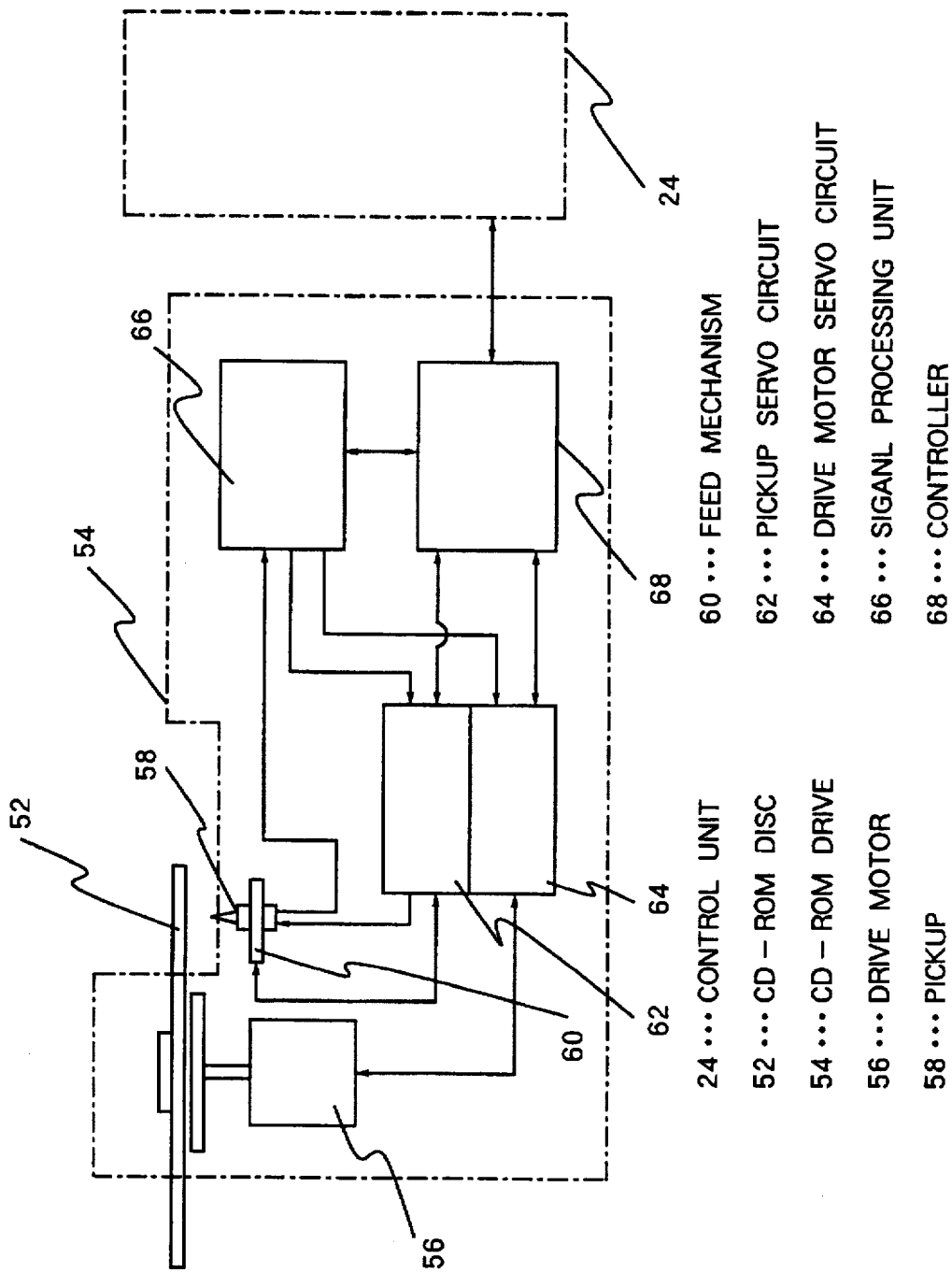
FIG. 3 is a block diagram illustrating details of the external memory unit of the navigation apparatus of FIG. 2.

As shown in FIG. 3, the external memory unit 18 is the combination of a CD-ROM disc (hereinafter, simply referred as to "disc") 52, and a CD-ROM drive 54. The disc 52 records various data such as map data, road data, intersection data, guide data, and picture data for registered points, as well as their address size, with respective predetermined addresses in the CLV (constant linear velocity) recording method for maximum recording density. The disc 52 is detachable from the CD-ROM drive 54.

The CD-ROM drive 54 has the capability of reading out the various data recorded at the predetermined addresses while rotatively driving the disc 52 and includes a drive motor in the form of a spindle motor with brushes or a whole motor for rotatively driving the disc 52; a pickup 58 equipped with a laser light source, an objective lens, a photodetector, and the like for reading data recorded on the disc 52. A feeding mechanism 60 moves the pickup 58 to a designated position so that the pickup 58 can read the data recorded at the respective addresses on the disc 52. A pickup servo circuit 62 controls the movement of the feeding mechanism 60 and controls the position of the objective lens of the pickup 58 so that the laser beam follows signal tracks on the disc 52 while the signal face of the disc is positioned within the field of focus of the laser beam emanating from the pickup 58 even if the disc face rocks or the rotation is eccentric. A drive motor servo circuit 64 controls the rotational speed of the drive motor 56 so that the disc 52 rotates with a constant linear velocity. A signal processing unit 66 amplifies the output signal of the photodetector in the pickup 58, reforms its waveform, processes the digital signal, and processes the signal for error correction, thereby retrieving the desired data from the disc 52. Controller 68 transmits the data from the signal processing unit 66 to the controller 24 and outputs control signals to the pickup servo circuit 62 and the drive motor servo circuit 64, responsive to various requests such as a request for reading data delivered from the controller 24. The drive motor 56 and the drive motor servo circuit 64 together function as the drive mechanism of the present invention.

The controller 24 executes various routines, such as: a position setting routine for setting departure, current position, destination, or the like in accordance with commands inputted from the input unit 16; a route seeking routine for determining the optimum route from the departure to the destination; an information display routine for displaying on the display screen of the display unit 22 a map on which the current position is centered and various guidance messages; a scrolling routine for scrolling the displayed map; a map scale changing routine for changing the map scale between a wide area map and a detailed map and a voice output routine whereby the voice output unit 20 outputs voice guidance. In executing these routines the controller 24 issues a command for reading out the necessary data from the corresponding addresses on the disc 52 in the external memory unit 18, and the pickup 58 travels to the corresponding address on the disc 52 in response to the command to read out the necessary data.

In reading data in the manner described above, the rotational speed of the drive motor 56 is controlled by the drive motor servo circuit 64 based on a reproduced synchronizing signal read off the disc through the pickup 58, because the data recorded in the CLV format on the disc 52 are precisely read out by rotating the disc 52 at a constant linear velocity.

Figure 4:
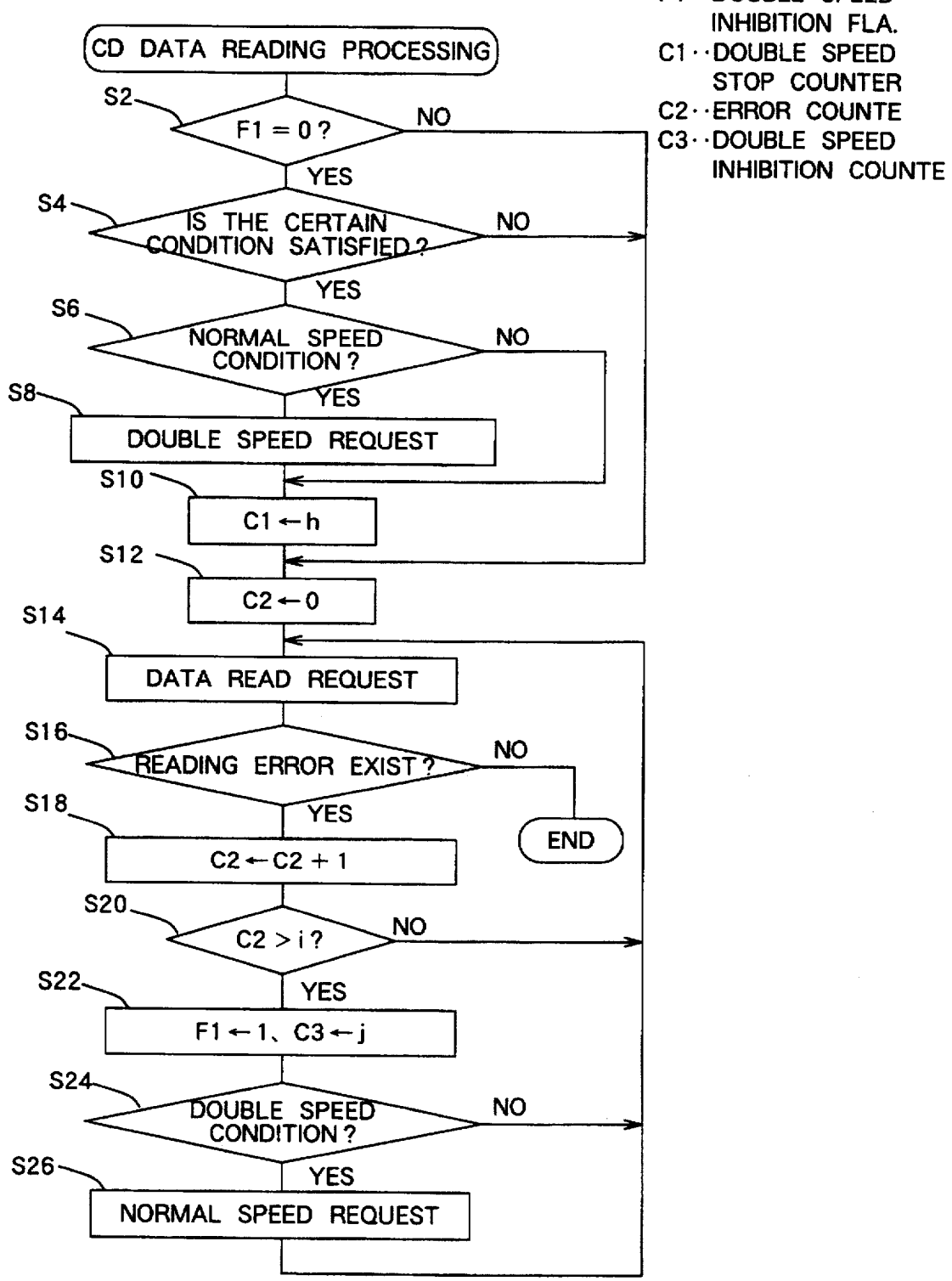
FIG. 4 is a flow chart of a CD data reading routine executed by the controller of the embodiment illustrated in FIG. 2.
Figure 5:
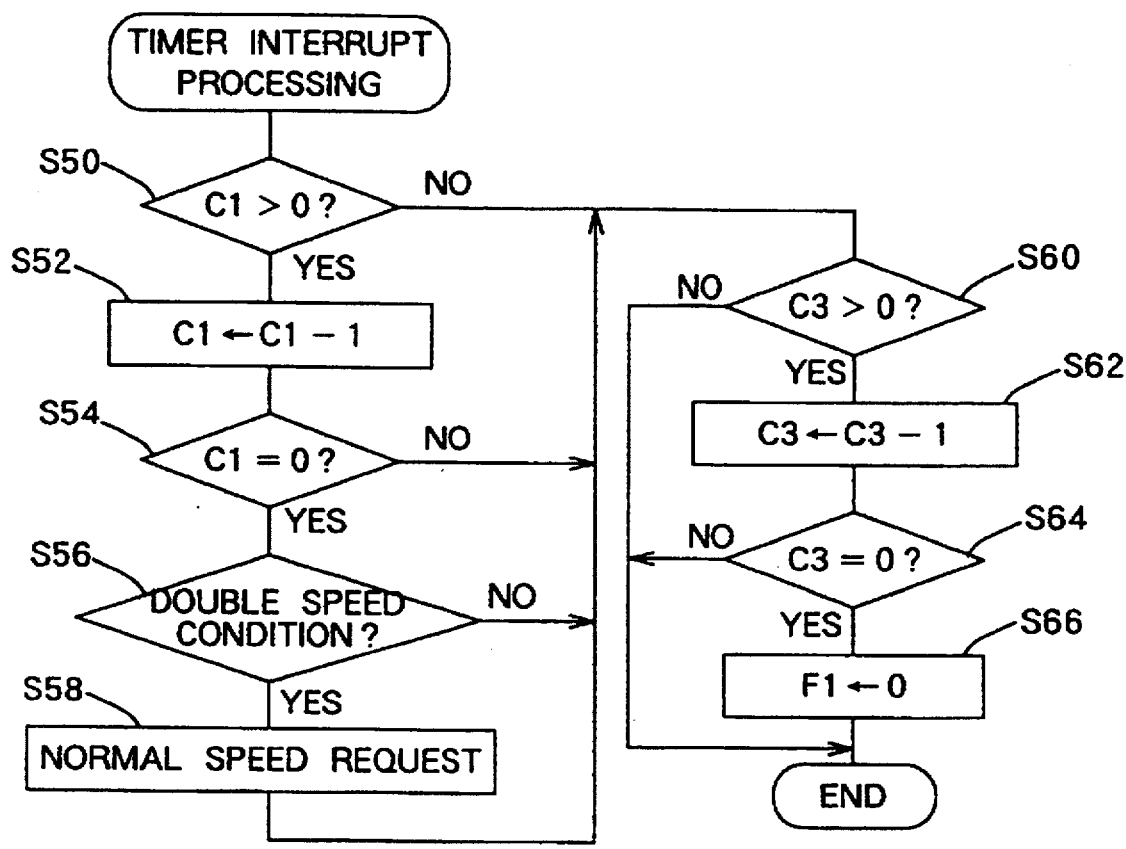
FIG. 5 is a flow chart of a timer interrupt routine executed by the controller of the embodiment illustrated in FIG. 2.

FIGS. 4 and 5 illustrate a routine (hereinafter, referred to as "present routine") executed by the controller 24 for accelerating the reading of data by rotating the disc 52 at double the normal rotational speed of the drive motor 56 (hereinafter, referred to as "double speed") responsive to detection of a certain condition and for taking corrective action to deal with data reading errors which tend to occur due to such a doubled speed of rotation of the disc 52.

The present routine includes the CD data reading routine shown in FIG. 4, repeatedly executed each time a command is issued from the controller 24 for reading data recorded on the disc 52. A timer interrupt routine (shown in FIG. 5) is executed at an operation period of 0.1 second to process counters and flags used during the CD data reading routine.

When the CD data reading routine shown in FIG. 4 is started, the controller 24 judges at step S2 whether the double speed inhibition flag F1 is ON (F1=1). If F1=0, i.e. there is no double speed inhibition, the routine goes to step S4, and the controller 24 judges as to whether a designated condition is satisfied, to rotatively drive the drive motor 56 at double speed, i.e. whether or not a designated command signal has been received or a designated condition satisfied. On the other hand, if F1=1, the double speed inhibition mode is established. If the judgement made at step S2 is negative, the routine skips steps S4 to S10, to let the drive motor 56 rotate at double speed, and immediately goes to step S12.

Step S4 checks for satisfaction of one of the following five conditions, in which the navigation apparatus 10 is particularly required to respond more quickly by fast reading of data and rapid execution.

Firstly, issuance of a command to display the current position on a map, an operation beginning with the detection of power-on of the navigation apparatus 10 and continuing until confirmation that the current position is centered on the displayed map.

Secondly, issuance of a command to change the map display, an operation beginning with detection of operation of a touch or contact switch, for moving the center of the map, for scrolling the map displayed on the display screen or for changing the scale of the displayed map, and continuing until the detection of the completion of display of the desired map.

Thirdly, issuance of a command for a route search, route searching beginning with the detection of an execution command for the route search routine and continuing until detection of completion of the search processing.

Fourthly, a determination that the sensor detected value for travel speed of the vehicle is equal to or greater than a predetermined value, for example, a value corresponding to 100 km per hour, which operation continues until detection that the detected value has fallen below the predetermined value.

Fifthly, a data size determination in step S4 that the size of the data requested to be read from the disc 52 is equal to or greater than a predetermined size, for example 100 kbite. The routine goes to S6 responsive to an affirmative judgement.

The first to third, and fifth conditions relate to operation of the navigation apparatus 10, while the fourth condition relates to operation of the vehicle. On the other hand, if none of the first to fifth situations is present, a negative judgment is made at step S4, and the routine skips steps S6 to S10 and immediately goes to S12. The controller 24 functions as judgment means by judging at step S4 presence of one of the aforementioned five situations, i.e. satisfaction of a designated condition.

A judgment is made at step S6 as to whether the drive motor 56 is rotating at normal speed. If the motor is rotating at normal speed, an affirmative judgment is made at step S6, and the routine goes to step S8, at which a command for the drive motor 56 to rotate at double speed is sent to the controller 68, and then the routine goes to S10. Upon execution of step S8, a control signal is sent based on the command from the control unit 24 to the controller 68 and to the drive motor servo circuit 64, and the drive motor 56 is made to rotate at double speed responsive to the control signal, thereby rotating the disc 52 at double speed. The controller 24 executing the routine at step S8, in combination with the controller 68, functions as the control means of the invention.

If the drive motor 56 is already rotating at double speed, a negative judgment is made at step S6, and the routine skips step S6 and immediately goes to step S10. At step S10, in order to avoid frequent changes between double speed and normal speed, a double speed stop counter C1 times the period from the satisfaction of the designated condition described above until the drive motor 56 continuously drives rotatively with double speed, reads a predetermined value h corresponding to the predetermined time to set the predetermined value (count) for h. At step S12, which is executed subsequently to execution of step S10 or executed when a negative judgment is made at any of steps S2, S4, an error counter C2, for counting the number of error occurrences of the data read out of the disc 52, is reset.

A request for reading data at a designated address and size on the disc 52 is output to the controller at step 14 subsequent to step S12. Upon this request, the data read at the pickup 58 and processed at the signal processing unit 66, is transmitted to the controller 24 via the controller 68. When reading the requested data is completed, the operation goes to S16 from step S14, and it is judged whether the data read to the controller 24 contains reading errors that the signal processing unit 66 could not correct. If the data do not contain such a reading error, a negative judgment is made at step S16, and this CD data reading processing is ended. On the other hand, if the data contains a reading error, an affirmative judgment is made at step S16, and the operation goes to S18.

A value of 1 is added to the total of the error counter C2 at step S18, and then the routine goes to step S20, at which a judgment is made, according to whether the total of errors counted by C2 is equal to or greater than a predetermined value i. If the reading errors of the data do not exceed the predetermined number of times, a negative judgment is made at step S20 since C2 is equal to or less than i, and the routine returns to step S14, repeats the read request for the data outputted immediately before, again executes the reading of data, and repeats the execution of steps S16 and S18 as described above. In contrast, if the reading errors exceed the predetermined number, an affirmative judgment is made at step S20 since C2 is greater than i, and the routine goes to step S22. At step S22, the double speed inhibition flag F1 is set (F1=1), thereby placing the apparatus in the double speed inhibiting mode, and a predetermined value j, corresponding to a predetermined time for lapse of the double speed inhibiting mode is read into a double speed inhibition counter C3 as a count for measurement of time in the double speed inhibiting mode.

At step S24 to be executed subsequently to step S22, a judgment is made as to whether the drive motor 56 is rotating at double speed. If the drive motor 56 is rotating at normal speed, the operation returns to step S14 immediately after a negative judgment is made at step S24, and step S14 and the following steps described above are again executed. On the other hand, if the drive motor 56 is rotating at double speed, an affirmative judgment is made at step S24 and the operation goes to step S26. After a request is made to rotate that drive motor 56 at normal speed is fed to the controller 68, the operation returns to step S14. By execution of step S26, a control signal is sent from the controller 68 to the drive motor servo circuit 64. Based on the control signal, the drive motor 56 is again switched to normal speed, thereby causing the disc 52 to rotate at normal speed.

Thus, in the CD data reading routine, when it is not in the double speed inhibition mode (the double speed inhibition flag F1=0, S2: YES) and when the designated condition is satisfied (S4: YES), the request to switch the drive motor to double speed is output (S6: YES, S8) and, responsive to this output signal, the drive motor 56 rotates at double speed, thereby rotating the disc 52 at double speed. The data corresponding to the request is read at S14 and, if the read data has no error (S16: NO), this processing ends. On the other hand, if the read data has an error or errors (S16: YES), the same data is repeatedly read until the controller can read the requested data without error (S14 to S18), and at that time, if the reading errors exceed the predetermined number (C2>i, S20: YES), the drive motor 56 rotating at double speed is switched to normal speed (S24: YES, S26), thereby rotating the disc 52 at normal speed.

In the timer interrupt routine illustrated in FIG. 5, a judgment is made first at step S50 as to whether the total of double speed stop counter C1 is greater than zero. If C1 is greater than 0, an affirmative judgment is made at step S50, and the routine goes to step S52 and subsequently goes to step S54 after one is subtracted from the value of C1. If C1 is equal to or less than 0, a negative judgment is made at step S50, and the routine skips steps S52 to S58 and immediately goes to step S60 described below.

A judgment is made at step S54 as to whether or not the double speed counter C1 is equal to zero. If C1 is not equal to zero, a negative judgment is made at step S54, and the routine skips steps S56, S58 and immediately goes to step S60. If C1 is equal to 0, an affirmative judgment is made, and the operation goes to step S56. At step S56, a judgment is made as to whether the drive motor 56 is rotating at with double speed. If the motor 56 is at normal speed, a negative judgment is made at step S56, and the routine skips step S58 and immediately goes to step S60. If the drive motor 56 is rotating at double speed, an affirmative judgment is made at step S56, and the routine goes to step S58 and then goes to S60, responsive to a request for rotation of the drive motor 56 at normal speed delivered to the controller 68. By execution of step S58, a control signal is sent from the controller 68 to the drive motor servo circuit 64 based on the request output from the controller 24. The drive motor 56 is rotatively driven, based on the control signal, at normal speed, thereby rotating the disc 52 at normal speed.

At step 60, which is executed subsequent to step S58 or executed after a negative judgment is made at any of steps S50, S54, S56, a judgment is made as to whether or not the double speed inhibition counter C3 is greater than zero. If C3 is greater than 0, an affirmative judgment is made at step S60, and the routine goes to step S62 and then goes to S64 after one is subtracted from the value of C3. If C3 is equal to or less than zero, a negative judgment is made at step S60, and the operation skips steps S62 to S66 and immediately temporarily halts the timer interrupt processing. A judgment is made at step 64 as to whether the double speed inhibition counter C3 is equal to zero. If C3 is not equal to zero, a negative judgment is made at step 64, and the operation skips step S66 and immediately, but temporarily, ceases the timer interrupt processing. If C3 is equal to zero, an affirmative judgment is made at step S64, and the operation goes to step S66. After leaving the double speed inhibition mode by removing the flag F1, the routine temporarily ceases the timer interrupt routine.

In the timer interrupt routine, during steps 50 to 58, the double speed stop counter C1, that has read the predetermined value h and been set to it during the CD data reading, when one of the first to fifth situations above is met, is made to decrease its counter value every execution of the timer interrupt routine (S50: YES, S52), and the drive motor 56 is continuously driven at double speed until lapse of a predetermined time started when the designated condition is met. Thus, the drive motor 56 running at double speed is switched to normal speed (S56: YES, S58) when C1 becomes zero (S54: YES). During steps S60 to S66, the double speed inhibition counter C3, that has read the predetermined value j and been set to it when the number of reading errors exceeds the predetermined number i (C2>i) in the CD data reading process described above, is decreased by one every execution of the timer interrupt routine (S60: YES, S62). When C3 becomes zero (S64: YES), the operation in the double speed inhibition mode is ended (S66, F=0).

As described above in detail, in this embodiment, data is read at high speed (S14) as the disc 52 rotates at double speed by switching the drive motor 56 to double speed (S6: YES, S8), so that the time required for execution of the aforementioned operations is thereby shortened. Specifically, the time interval between detection of power-on of the navigation apparatus 10 until confirmation that the current position is centered on a map display is shortened. Secondly, likewise shortened is the time interval from the detection of operation of a touch or contact switch for moving the center of the map, or scrolling the map, being displayed on the display screen, or for changing the scale of the displayed map on display until detection of display of the desired map. Thirdly, also shortened is the interval from the detection of an execution command for the route search until the detection of the completion of the search. The fourth interval shortened is that between a determination that the output value of a sensor detecting the travel speed is equal to or greater than a predetermined value (for example, a value corresponding to 100 km per hour), and display of the current position centered on the display screen. Moreover, the apparatus can provide proper guidance without delay by such acceleration of the data reading even when, for any requested operation, it detects that the requested data size to be read from the disc 52 is equal to or greater than a predetermined size, for example, 100 kbite or more, specifically, when guidance is to be provided by displaying a picture of a destination or intersection on the screen.

The data reading speed with the disc 52 rotating at double speed is 300 kbite per second whereas the data reading speed with the disc 52 rotating with normal speed is 150 kbite per second. Therefore, in this embodiment, the apparatus can read a large amount of data in a short period of time from the disc 52 by switching the disc 52 from normal speed to double speed to perform certain reading tasks. In addition, because the data is read with the drive motor 56 rotating at normal speed when none of the first to fifth situations is present (S4: NO), in other words because the situations in which the rotation speed of the drive motor 56 is switched to the double speed are limited on the first to fifth situations which specifically require high speed data reading, the durability of the drive motor 56 is greater than in the case where the drive motor 56 is constantly rotated at double speed.

As noted above, although operating with the motor driving the memory medium at double speed allows high-speed data reading from the memory medium, operating the motor constantly at double speed is avoided since it would reduce the durability of the motor. In a navigation apparatus for a vehicle, though required to rapidly respond since the vehicle travels at a relatively high speed, the apparatus needs the double speed reading only in limited situations. Accordingly, in this embodiment, the apparatus can change its speed from normal speed to double speed only when detecting one of those limited number of conditions in which the apparatus has to deal a large amount of data in a short period of time.

In this embodiment, the error counter C2 that is reset prior to the output of a request for reading data (S12) counts reading errors contained in the read data (S16, S18), and if the reading errors exceed the predetermined value i (S20: YES), the drive motor 56 rotating at double speed is switched to normal speed (S24: YES, S26) to rotate the disc 52 at normal speed. However, if the double speed inhibition flag F1 is on (S22), the rotational speed of the drive motor 56 is not switched to double speed from normal speed even if one of the five aforementioned conditions is satisfied (S2: NO). Therefore, when errors in the read data continue to occur when the drive motor 56 is rotatively driven at double speed, the disc 52 is made to rotate at normal speed by switching the rotational speed of the drive motor 56 to normal speed, thereby enabling the controller to read the requested data without error, and enabling the controller to deal with errors in the reading to data that tend to occur due to the double speed rotation of the disc 52.

Further, in this embodiment, when errors in reading exceed the predetermined number i (S20: YES), the double speed inhibition flag F1 is turned ON as described above (S22) to establish the double speed inhibition mode, thereby running the drive motor 56 at normal speed even if a command issues to initiate one of the aforementioned five operations. The double speed inhibition counter C3 in which the predetermined value j is read, is set and decreased by one upon every execution of the timer interrupt routine (S60: YES, S62), and the double speed inhibition condition mode is dissolved by turning the double speed inhibition flag F1 off (S66) when C3 is equal to zero (S64: YES). By utilization of the double speed inhibition flag F1 and the double speed inhibition counter C3, the disc 52 is prohibited from rotating at double speed, in a double speed inhibition mode, until the condition, wherein reading errors tend to exceed the predetermined number, is corrected based on experiences indicating that the errors in reading tend to occur where the disc 52, the drive motor 56, and whatever are, for example, subject to low temperature or high temperature, thereby preventing errors in data reading from occurring again.

Moreover, in this embodiment, the drive motor 56 is switched to drive at double speed upon satisfaction of any of the first to fifth conditions described above and continues to rotate at double speed for a period of time determined as follows. First, the double speed stop counter C1 reads in the predetermined value h (S10) when any of the first to fifth conditions described above is satisfied (S4: YES). C1 is reduced each time the timer interrupt routine is executed and when C1 becomes zero (S54), the drive motor 56 rotating at double speed is switched to normal speed (S56: YES, S58). Further, the apparatus avoids frequent switching of the drive motor 56 between normal and double speeds and achieves effective control of the rotation speed of the drive motor 56.

While in the foregoing embodiment the drive motor 56 is switched between normal speed and a speed twice that of normal speed, the drive motor 56 can be driven at any speed rotating the disc 52 at a speed higher than normal speed, e.g. two times, four times or eight times the normal speed.

In general, the drive motor rotatively driving the CD-ROM disc will be one of the following two types: a drive motor that begins to rotate as necessary to read data from the disc and then stops rotating a while after completion of reading the data; and a drive motor that begins to rotate at the same time that the CD-ROM drive is initialized by turning on the power of the system in which the CD-ROM is incorporated and that continuously rotates until the power of the system is turned off. This invention is applicable to both types of motor operation described above. However, because the latter type is more susceptible to a short drive motor service life, the invention is more effective in the latter case than in the former.

Furthermore, although the foregoing embodiment is described as incorporated into the navigation apparatus 10 mounted on a vehicle, the invention is not restricted to use in such a navigation apparatus. Moreover, as used in navigation apparatus 10 it is easily detachable from the vehicle and brought into the home where it may be connected to a television set for determining the optimum route for the set points of departure and destination with display of a map on the screen of the television set. After such use, it may be reattached to the vehicle for guidance along the optimum route from the point of departure to the destination which have been set in the home.

The navigation apparatus to be mounted in a vehicle must be made compact because the apparatus must fit, for example, behind a dashboard or below a seat, so as not to disturb passengers. Accordingly, as the apparatus is made more compact, the size of the drive motor for driving the memory medium must become more compact, but the durability of the drive motor is reduced as its size is made smaller. Therefore, if the apparatus according to the invention is applied to a navigation apparatus for a vehicle, it is very effective in improving the durability of the drive mechanism.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An information processing apparatus comprising:
   a memory medium in which data is stored;
   a drive motor for driving said memory medium at least at two different operating speeds for reading of said data, including a first speed and a second speed faster than said first speed, responsive to an input signal;
   read means for reading the stored data from said driven memory medium, responsive to various command signals inclusive of at least one designated command signal, at said different speeds;
   judgment means for making an affirmative judgement by detection of input of a designated command signal or satisfaction of one of a plurality of predetermined conditions and making a negative judgement when no designated command signal or predetermined condition is detected; and
   control means for controlling the speed of rotation of said drive motor to drive said memory medium at said first speed responsive to said negative judgement and at said second speed responsive to said affirmative judgement.

2. The information processing apparatus as set forth in claim 1, wherein said one predetermined condition is when one of said various commands is a command to said read means to read an amount of data, larger than an amount predetermined to be properly processable by said processing means with the drive mechanism rotating at said first speed.

3. The information processing apparatus as set forth in claim 1, wherein said one predetermined condition is when a vehicle, in which the information processing apparatus is mounted or attached, is detected to be travelling at a speed exceeding a predetermined speed.

4. The information processing apparatus as set forth in claim 3, wherein another of said predetermined conditions is when the size of the stored data to be read is greater than or equal to a predetermined size.

5. The information processing apparatus as set forth in claim 1, wherein said control means comprises stop timer means to keep said drive motor at said second speed for a predetermined period of time after the drive motor begins to rotate at the second speed.

6. The information processing apparatus as set forth in claim 1, wherein said drive motor is automatically switched to the first speed by lapse of a predetermined period after an affirmative judgement by said judgment means.

7. The information processing apparatus as set forth in claim 1, wherein said control means includes error counting means for counting reading errors occurring in the read data and for establishing an inhibiting mode in which the drive motor is prevented from operating at said second speed when the error count exceeds a predetermined value.

8. The information processing apparatus as set forth in claim 7, wherein said control means includes reset timer means for dissolving said inhibiting mode after a predetermined period of time of operation in said inhibiting mode has lapsed.

9. The information processing apparatus as set forth in claim 1, wherein said control means comprises data processing means for executing a routine by processing the read data and for timer interrupt processing to set and reset one or more counters and flags used in the routine; and a memory containing, stored therein, a program for said routine.

10. The information processing apparatus as set forth in claim 1, wherein said memory medium is self-contained and detachable from the drive motor.

11. The information processing apparatus as set forth in claim 1, wherein said memory medium is a CD-ROM.

12. The information processing apparatus as set forth in claim 11, wherein said CD-ROM contains stored data recorded at constant linear velocity.

13. The information processing apparatus as set forth in claim 1, wherein said drive motor begins to drive responsive to a request to read data from the memory medium and ceases after the reading of the requested data is completed.

14. The information processing apparatus as set forth in claim 1, wherein said drive motor begins to drive at the same time that the information processing apparatus is turned on and ceases when the information processing apparatus is turned off.

15. The information processing apparatus as set forth in claim 1, wherein said second speed is twice said first speed.

16. The information processing apparatus as set forth in claim 1 wherein said second speed is double said first speed.

17. The information processing apparatus as set forth in claim 1 wherein said plurality of predetermined conditions includes:

issuance of a command to display a map showing the present position of a vehicle on which the apparatus is installed;

issuance of a command to change the map display;

issuance of a command to search said data to determine a route for the vehicle;

detection of a travelling speed of the vehicle at least equal to a predetermined value; and a command to read a quantity of data of a size at least equal to a predetermined amount.

18. A vehicle navigation apparatus comprising:

sensor means for detecting present location of the vehicle;

a memory medium in which guidance data is stored, said guidance data including map data;

a drive motor for driving said memory medium at least at two different operating speeds for reading of said data, including a first speed and a second speed faster than said first speed;

a display unit;

input means operable by a driver of the vehicle, for input of a destination and for input of various commands including a designated command for execution of a route search routine for determining an optimum route to said destination;

read means for reading the guidance data from said driven memory medium responsive to an input command at said different speeds;

detection means for detecting satisfaction of a predetermined condition;

judgment means for making an affirmative judgement by detection of input of a designated command or detection of satisfaction of a predetermined condition and making a negative judgement when no designated command or predetermined condition is detected; and control means for controlling the speed of rotation of said drive motor to drive said memory medium at said first speed responsive to said negative judgement and at said second speed responsive to said affirmative judgement, said control means comprising data processing means for determining present location based on signals received from said sensor means, for retrieving guidance data through said read means, for processing the retrieved guidance data to produce guidance information including a display of a map at said display unit with the predetermined present location indicated thereon.

19. The vehicle navigation apparatus as set forth in claim 18, wherein said predetermined condition is when one of said various commands is a command to said read means to read an amount of data, larger than an amount of data predetermined to be properly processable by said processing means with the drive motor rotating at said first speed.

20. The vehicle navigation apparatus as set forth in claim 18, wherein said sensor means includes a vehicle speed detector and wherein said predetermined condition is when the detected vehicle speed exceeds a predetermined speed.

21. The vehicle navigation apparatus as set forth in claim 18, wherein said control means includes error counting means for counting reading errors occurring in the read data and for establishing an inhibiting mode in which the drive motor is prevented from operating at said second speed when the error count exceeds a predetermined value.

22. The vehicle navigation apparatus as set forth in claim 21, wherein said control means further comprises reset timer means for dissolving said inhibiting mode after a predetermined period of time of operation in said inhibiting mode has lapsed.

23. The vehicle navigation apparatus as set forth in claim 18 wherein said second speed is double said first speed.

24. The vehicle navigation apparatus as set forth in claim 18 wherein said predetermined condition is at least one of the following:

issuance of a command to display a map showing the detected present location of the vehicle;

issuance of a command to change the map display;

issuance of a command to search said guidance data to determine a route for the vehicle;

detection of a travel speed of the vehicle at least equal to a predetermined value; and issuance of a command to read an amount of said guidance data of a size at least equal to a predetermined size.

* * * * *